June 18, 1957 P. MORRISON 2,796,529
RADIATION SHIELD
Filed Aug. 23, 1948
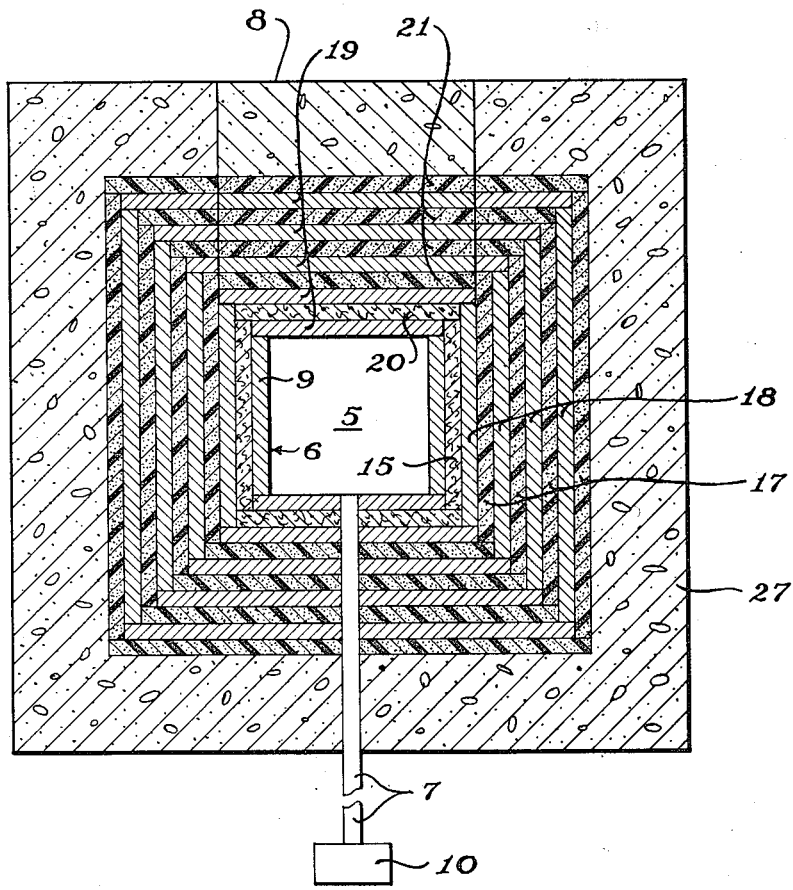
WITNESSES
Ralph Carlisle Smith
Frank M. Blair
INVENTOR.
Philip Morrison
BY
Roland A. Anderson
Attorney 2,796,529

RADIATION SHIELD

Philip Morrison, Ithaca, N. Y., assignor to the United States of America as represented by the United States Atomic Energy Commission Application August 23, 1948, Serial No. 45,681

1 Claim. (Cl. 250—108)

The present invention relates to a shield capable of absorbing rays emitted from a source of radiation and, more particularly, to a shield capable of absorbing fast neutrons.

In many operations involving materials, devices or systems which emit radioactive rays, it is necessary to confine the radioactivity to a predetermined area with a shielding device in order to protect nearby personnel and equipment.

Since X-rays are the most common form of radioactive rays used in industry and in the medical field, most shields have been developed to absorb such radiation. Shields of this type, in the main, have relied on the X-ray or gamma ray absorbing characteristic of a dense material as, for example, lead, bismuth or iron.

Such a shield comprising alternate layers of lead and synthetic resin is disclosed by Dillehay et al., in U. S. Patent 2,183,790, December 19, 1939. Goldrick et al., in U. S. Patent 2,403,794, July 9, 1946, describe a plastic composition which is opaque to X-rays comprising salts of lead, bismuth, thorium or other heavy metal dispersed throughout a plastic material matrix.

The shields described in the above cited U. S. patents and other similar shields well known in the art are said to be efficient X-ray, gamma ray and charged particle absorbers, but none is particularly effective in absorbing high energy, fast moving neutral particles, namely, fast neutrons.

A shield capable of stopping various types of radiation including neutrons is disclosed in the co-pending application of Fermi et al., Ser. No. 641,625, filed January 16, 1946. This shield comprises a plurality of alternate layers of hydrogenous material and iron. Charged particles such as protons, alpha and beta particles, and the like are stopped by reason of the mass of the shielding material, while gamma rays are absorbed by the dense iron layers. Fast neutrons rapidly lose energy by numerous elastic collisions with hydrogen nuclei and eventually lose their existence in the shield. Some energy is lost through inelastic scattering and capture by the iron nuclei. Other neutrons are absorbed in hydrogen nuclei yielding deuterium nuclei. As a result of these processes there are present recoil protons and gamma rays. As before, the protons are stopped in the hydrogenous material or by the iron layers, and the generated gamma rays are absorbed by the iron layers. These secondary gamma rays, however, require a considerable mass of iron in order to prevent the transfer of radiation through the shield. The increased mass of iron necessary to reduce the harmful radiation to a minimum increases the weight and volume of the shield to an extent that it is not only costly and inconvenient but effectively prohibits its use in portable installations.

It is therefore a primary object of this invention to provide a low volume shield which will absorb substantially all types of radiation including neutrons.

It is another object of this invention to provide a method for shielding a radiation source by which fast, high energy neutral particles are converted into more readily absorbed particles.

It is another object of this invention to provide a shield for a neutron source which is characterized by a minimum thickness.

It is another object of this invention to provide a shield for the protection of personnel and equipment.

It is still another object of this invention to provide a shield which will prevent the undesired escape of biologically harmful radiation from a source of radiation.

Still other objects and advantages of this invention will be apparent to one skilled in the art upon studying the following description.

In general, the objects of this invention are obtained by a radiation shield comprising alternate layers of a dense material and a mixture of neutron-slowing material and a substance having nuclei which will upon the absorption of a neutron be transmitted into another element and a heavy charged particle without the substantial release of high energy gamma rays, the absorption cross section of said element for low energy neutrons preferably being at least 0.05 barns. In this shield, neutrons are converted into a substantially corresponding number of heavy charged particles which can be stopped with small amounts of shielding rather than into gamma radiation which requires large amounts of dense shielding.

Certain light elements, for example, boron aluminum, fluorine, have a high absorption cross section for low energy neutrons and yield an alpha particle and a nucleus of another element. For example, in the usual notation:

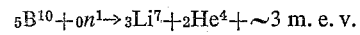

$$_5B^{10} + _0n^1 \rightarrow {_3}Li^7 + _2He^4 + \sim 3 \text{ m. e. v.}$$

As is seen in the above illustrative reaction, an alpha particle results when a neutron reacts with a boron nucleus without giving off a high energy gamma ray. Furthermore, the radiation need not be alpha particles but may be other heavy charged particles, for example, nitrogen may be the neutron-absorber yielding protons as the heavy charged particles.

For neutrons with energies of about 1.5 m. e. v. normal polyisotopic boron has an absorption cross section of about 0.5 barns, i. e., $0.5 \times 10^{-24}$ square centimeters. However, at 0.6 m. e. v., the absorption cross section has increased to 2.5 barns and at 0.2 m. e. v. to 3.6 barns. Thus by slowing down the neutrons, the absorption cross section of boron, which varies almost inversely with neutron velocity, is materially increased.

Therefore, in the preferred embodiment, means are provided in the shielding for reducing neutron energies. This reduction of neutron energy is best accomplished when neutrons are made to pass through a material wherein the neutrons collide with large numbers of light nuclei, preferably normal hydrogen. A hydrogenous material, for example, a paraffin or a synthetic resin high in hydrogen content is used for such purposes. Upon each collision with a hydrogen nucleus, a neutron will lose about sixty percent of its energy. For example, a 5 m. e. v. neutron will be reduced to about a 100 electron volt neutron in about 12 collisions with hydrogen nuclei.

Generally, in a process where high energy particles are involved, there is some resultant emission of gamma rays by hydrogen capture. To stop these gamma rays and any gamma rays emitted from the original source of radiation, dense metals such as iron or lead are also employed in the shielding. It should be noted that the gamma rays generated in the present type shielding are fewer in number and, on the average, substantially lower in energy than those generated in prior are shielding because substantial neutron absorption occurs in the boron which does not yield high energy gammas and fewer neutrons are captured or inelastically scattered by the dense gamma shielding material.

It may be seen that a very effective radiation shield is now available by suitably combining a neutron-slowing material, a neutron-absorbing material having an absorption cross section substantially higher than that of hydrogen and not yielding high energy gamma rays upon neutron capture, and a gamma ray stopping material which has a low neutron capture cross section. Such a radiation shield may be constructed of a hydrogenous material, a neutron absorber and a gamma ray shield in series or in combination. Because secondary gamma radiation must be stopped, the gamma shielding must be external if only one layer thereof is used. However, multiple layers are preferred in view of the possibility of some gamma ray production in the first gamma ray shielding.

A convenient way to incorporate both neutron absorber such as boron and hydrogen into the radiation shield is to mix boron powder into a hydrogenous material, such as a synthetic resin plastic. This may be done, for example, by adding a finely divided neutron absorber to a fluid or plastic hydrogenous organic compound, such as a monomeric organic compound of the acrylate type which is then polymerized. The absorber may be incorporated in a thermoplastic, pressure plastic or a fluid heat-settable resin or other hydrogenous organic compound or composition, by kneading, rolling or the like.

Similarly the gamma ray shielding need not be dense metal sheets but may be made from finely divided metal added to similar organic binders or dense metal compounds dissolved in or dispersed through an organic binder. The neutron-absorber and/or the dense nuclei material may be in chemical combination with the neutron-slowing material, e. g. polyvinyl fluoride, cellulose nitrate, polyvinyl borate, or the like.

Although it is preferred to use laminar structure with the outermost shielding of dense metal material, it is possible to prepare a single layer composition of mixed neutron absorber, heavy nuclei material and hydrogenous material. For example, a cellulose acetate plastic having dispersed therethrough by means of a Banbury mixer a mixture of aluminum and iron stearates can be used in a shield, but great thickness would be required.

Additional features and advantages of a radiation shield constructed in accordance with the present invention will appear from the following detailed description of a presently preferred embodiment depicted in the single drawing made a part of this specification. This embodiment is presented by way of example only and should not be deemed to limit the scope of the invention.

In the drawing, there is shown a cross sectional view taken through the middle of a radiation source 5 which in turn is surrounded by a radiation shield generically designated by reference numeral 6. High energy particles, including fast neutrons, are emitted by source 5 and may pass unobstructed out through shield 6 by way of channel 7 to a desired target 10.

Shield 6 in the present embodiment is designed to absorb substantially all radiation from the source 5 which is characterized by a neutron flux at its center of $5 \times 10^{12}$ neutrons per square centimeter per second. More specifically, shield 6 comprises a three-inch layer of iron 9 immediately outward of source 5. Outwardly of iron casing 9 is disposed a three-inch layer 15 of a fibrous hydrogenous material, such as a board of pressed wood fiber which, because it is largely cellulose $(C_6H_{10}O_5)_x$, has a high hydrogen content, but will not melt nor appreciably mechanically disintegrate upon the intense radiation bombardment to which it is subjected by reason of its position.

Outwardly of the fibrous material 15 and adjacent thereto, alternating three-inch layers of iron 18 and three-inch layers 17 of a cellulose acetate plastic containing at least one percent by weight of boron powder are disposed to complete the shield.

The cellulose acetate component of the plastic material 17 is essentially composed of carbon, hydrogen and oxygen in the relationship shown by the empirical formula: $(C_{10}H_{14}O_7)$. A small amount of plasticizer is also present. Plastic material 17 may be made by uniformly distributing borax powder $(Na_2B_4O_7.10H_2O)$ throughout a solution of cellulose acetate and solvent and then solidifying this combination by withdrawing the solvent by methods known in the art. About thirty-seven percent by weight of borax is used in the present embodiment yielding a boron concentration of approximately four percent by weight. As a result, about $6.2 \times 10^{22}$ boron nuclei for neutron absorption processes and $8.6 \times 10^{23}$ hydrogen nuclei for neutron-slowing processes are present in each cubic inch of plastic layers 17.

The optimum thickness of shield for any particular installation may best be determined by testing a sample shield under the same conditions which a finished shield of the herein described type will be used. When a source of less than $5 \times 10^{12}$ neutrons per square centimeter per second is to be shielded, the thickness of the shielding may be reduced, but the percentage of neutron-absorbing element included in the plastic layers should be maintained.

A wall 27 of watery, dense concrete may be placed outwardly of shield 6. Concrete, due to the hydration of its constituents during the setting process, contains a high percentage of hydrogen atoms. Thus a concrete wall may be employed as an added safety measure although it is not essential to the invention as substantially all harmful radiation is stopped in the presently described shield before reaching the last two boron plastic laminations.

In the present embodiment, an access port 8, consisting of iron segments 19, fibrous material 20 and the neutron-absorbing cellulose acetate borax segments 21, is provided for installation of the source 5. When the source is installed and has been tested, the shield segments comprising access port 8 are substantially permanently secured into position in such a way as to prevent any possibility of leaks through outlining cracks. For example, the iron segments 19 are welded into their respective positions with care being taken to avoid pin holes in the welded seams. The fibrous material 20 is secured into its position by a suitable binding material as, for example, glue. The neutron-absorbing cellulose acetate borax sections 21 are preferably secured in a substantially integral manner by a suitable cementing medium. This cementing medium preferably contains a solvent which will dissolve the edges of the cellulose acetate material involved in the joint. The dissolution of these involved edges causes them to flow together and insures continuous layers of neutron-absorbing cellulose acetate borax material of substantially uniform thickness.

Variations of the preceding embodiment of the invention may be obtained by incorporating other neutron-absorbing nuclei, along with or in place of the preferred boron[10], which nuclei yield charged particle radiation and substantially no high energy gammas upon neutron capture. Other neutron-absorbing nuclei such as light metallic metals as aluminum or normally gaseous elements such as fluorine or nitrogen may be incorporated into the shielding along with or in place of boron.

The neutron-absorbing agent chosen to be incorporated in a shield should have a high neutron absorption cross section and follow a process of transmutation to yield heavy charged particles but not high energy gamma rays. Likewise, neutron-slowing materials and arrangements other than those described may be utilized.

Aluminum may be incorporated into a shield by mixing the desired quantity of aluminum dust with the ingredients of the hydrogenous material, for example, the cellulose acetate material herein specifically employed, and then preparing this mixture in solid form, i. e., by the application of heat for plastic flow or by the polymerization of the hydrogenous material.

Fluorine may be included in a hydrogenous material in an inorganic compound as calcium borofluoride, $CaBF_5$, and/or in an organic compound as polytetrafluorethylene. A suitable inclusion of fluorine and hydrogen in this shield may also be accomplished by copolymerizing or by laminating together alternate thin sheets of synthetic resins, for example, polytetrafluorethylene and polythene. If the laminar procedure is to be employed, sheets of these materials preferably not to exceed one-eighth inch in thickness are placed in alternate layers until a desired thickness is reached.

Nuclei of nitrogen may be incorporated into a shield of the herein described type by using a urea formaldehyde, melamine formaldehyde or melamine-urea-formaldehyde synthetic resins as both the neutron-slowing (hydrogenous) and neutron-absorbing substances; or by grinding one of the above nitrogen-containing resins into small particles, mixing this ground material with the ingredients of the plastic hydrogenous material and forming the entire mixture into a solid by the application of heat or the polymerization of the monomeric hydrogenous material. Of course, boron[10] or its compounds such as calcium borofluoride, $CaB^{10}F_5$, may be also included in these compositions containing nitrogen.

It is apparent that what has been described is a method and means for diminishing high energy radiation of a highly penetrating character which, contrary to the usual prior art practices of imposing barriers specific to such radiation, provides for the conversion of such radiation into other types which are less penetrating and possess lower ranges of energies and thus are more readily absorbed. Therefore, as many different embodiments of this invention may be made without departing from the spirit and scope thereof, it is to be understood that this invention is not limited except as defined in the appended claim.

What is claimed is:

A shield for radiation including fast neutrons which consists essentially of a layer of iron, a layer of compressed wood fibers and a plurality of alternate layers of iron and of cellulose acetate containing boron dispersed substantially uniformly therein.

References Cited in the file of this patent

UNITED STATES PATENTS

| | | |
|---|---|---|
| 1,165,920 | Uyeno | June 4, 1912 |
| 1,312,937 | Abrahamsen | Aug. 12, 1919 |
| 1,368,094 | Angebaud | Feb. 8, 1921 |
| 1,703,416 | Donaldson | Feb. 26, 1929 |
| 2,206,634 | Fermi et al. | July 2, 1940 |
| 2,355,559 | Renner | Aug. 8, 1944 |
| 2,372,607 | Schwarzkopf | Mar. 27, 1945 |
| 2,400,477 | Atwood | May 21, 1946 |
| 2,439,374 | Leader et al. | Apr. 13, 1948 |

FOREIGN PATENTS

| | | |
|---|---|---|
| 114,150 | Australia | May 2, 1940 |
| 114,151 | Australia | May 3, 1940 |
| 861,390 | France | Oct. 28, 1940 |
| 233,011 | Switzerland | Oct. 2, 1944 |
| 233,278 | Switzerland | Oct. 16, 1944 |

OTHER REFERENCES

Pollard et al.: "Applied Nuclear Physics," p. 214, John Wiley & Sons (1942).

Smyth: "Atomic Energy for Military Purposes," August 1945, pp. 28, 45 and 85.

Goodman: "The Science and Eng. of Nuclear Power," pp. 418–419, Addison-Wesley Press, Inc. (1947).

Pearlman: "Atomic Energy in Industry," U. S. A. E. C. Document No. MDDC–592, dated November 18, 1946, declassified January 15, 1947, 8 pages.